United States Patent [19]
Shellnutt

[11] Patent Number: 5,860,216
[45] Date of Patent: Jan. 19, 1999

[54] HAND SAW ACCESSORY

[76] Inventor: Timothy D. Shellnutt, 10809 Campaign Ct., Manassas, Va. 20109

[21] Appl. No.: 861,359

[22] Filed: May 21, 1997

[51] Int. Cl.$^6$ .................................................. B23D 51/08
[52] U.S. Cl. ......................................... 30/296.1; 30/166.3
[58] Field of Search .............................. 30/166.3, 296.1, 30/329, 514, 517

[56] References Cited

U.S. PATENT DOCUMENTS

| | | |
|---|---|---|
| D. 306,817 | 3/1990 | McMorrough . |
| D. 307,383 | 4/1990 | Huang . |
| D. 307,702 | 5/1990 | Hsu . |
| D. 357,166 | 4/1995 | Concari . |
| D. 359,672 | 6/1995 | Gardner . |
| 1,177,024 | 3/1916 | Dragos ..................................... 30/166.3 |
| 1,423,506 | 7/1922 | Slothower .............................. 30/166.3 |
| 1,769,400 | 7/1930 | Talmage .................................. 30/166.3 |
| 2,762,407 | 9/1956 | McCord . |
| 4,411,068 | 10/1983 | Theodorides ........................... 30/166.3 |
| 4,716,653 | 1/1988 | Skyba ..................................... 30/296.1 |

*Primary Examiner*—Hwei-Siu Payer
*Attorney, Agent, or Firm*—Harold H. Dutton, Jr.

[57] ABSTRACT

A folding saw accessory comprising an elongated body portion, a longitudinal passageway extending into the body portion from one end thereof for receiving the handle of a folding saw therein, the passageway including a cutout formed in one longitudinal side of the body portion and forming a supporting portion, a securing bolt passing through the body portion and through the handle of a saw for retaining the saw in the passageway, a strap for encircling the body portion and the handle of a saw for securing the saw in the passageway, and an axial threaded passageway extending into the other end of the body portion for receiving an extension pole.

5 Claims, 2 Drawing Sheets

HAND SAW ACCESSORY

This invention relates to a hand saw accessory. More particularly the invention relates to an accessory for a hand saw of the type commonly known as a camping saw, and in particular to a handle by which a camp saw may be attached to an extension pole for extended reach.

BACKGROUND AND OBJECTS OF THE INVENTION

Hand saws are quite common accessory items for campers, hunters, farmers, gardeners, and for many different outdoor activities. A variety of folding hand saws are available which makes the saws easily carried without danger, and yet enables them to be opened for use with great ease. Typically such saws are used for trimming tree limbs and branches. For example, hunters carry these saws in order to clear branches from a hunting stand, and create a clear, unobstructed line of sight.

Many such saws are shown in the prior art, for example in U.S. Pat. Nos. D-357,166 to Concari, D-307,702 to Hsu, D-307,383 to Huang, D-359,672 to Gardiner and D-306,817 to McMorrough.

Hand saws such as these may be folded much like a pocketknife and carried in the user's pocket. Alternatively most of these folding saws also have a hole passing through the handle to which a carrying strap or the like may be attached, for carrying the saw hanging from one's belt. Also, such a strap serves to help the user hold onto the saw when it is being used.

One of the disadvantages of these folding saws, however, has been the fact that they are rather short and thus the user is limited by his own reach to tree limbs which can be removed with the saw. Occasionally this leads to dangerous situations wherein a user will try to overextend and reach a branch just slightly out of his ordinary reach. If he is a hunter in a tree stand, for example, the consequences can be very serious. But even on the ground one can underestimate the size or falling direction of a tree limb with obvious consequences. A few prior patents have provided saws with a way of attaching an extension handle but have met with little success because of limitations in the structural configurations. For example U.S. Pat. No. 4,411,068 relates to a saw having a band-saw type of blade in a tubular handle, with a coupling for attaching an extension, but the saw is a special purpose saw. Similarly U.S. Pat. No. 2,762,407 teaches a hand saw with an extension pole attached, but the special nature of the saw and the single attaching point limits general utility of the saw.

Accordingly a primary object of the present invention is to provide an accessory for a folding hand saw for adapting the saw to an extended reach capability.

Another object of the invention is to provide an accessory which enables a variety of folding hand saws to be extended by means of common extension handles.

A further object of the invention is to provide an accessory for a folding hand saw which serves to connect the handle of a hand saw to an extension pole.

Still another object of the invention is to provide an accessory for a folding saw which can itself serve as an auxiliary handle for the saw.

Yet another object of the invention is to provide an accessory of the type described which can be produced to adapt a number of different models of saws to readily available extension handles or can be made to fit specific, commercially available saws.

DESCRIPTION OF THE INVENTION

The accessory of the present invention comprises an elongated accessory body having a supporting opening at one end for receiving the handle of a hand saw within the opening. The body is preferably molded from a strong, durable plastic material which is capable of adequately supporting the saw for use. Alternatively, the body could be made of wood or other strong, light weight material. A projecting portion extends from the opening and serves to give support to the handle of the saw. The handle is retained in the supporting opening by means of a bolt or screw which passes through the body and through an opening in the handle of the saw. The bolt is secured by a suitable retaining nut.

In addition, a retaining strap is also preferably provided near the end of the body for securing the end of the accessory body and the saw handle together. Such a strap may be a strap of flexible material, securable by a hook-and-loop fastener, such as Velcro®, for encircling both the saw handle and the accessory body. The strap may be attached to the accessory body or may pass through openings provided in the body for that purpose.

The other end of the body is provided with a threaded opening for receiving an extension handle. Such handles are commonly available, for example with an "Acme" thread on the end, and a corresponding female "Acme" thread is provided in the opening. Thus, the threaded end of an extension pole may be inserted and threadedly engaged into the opening in the body.

In this manner, the extension pole becomes an extension of the saw handle, and the reach of the saw is extended by an amount equal to the length of the extension pole. Clearly extension poles which are themselves extendable, for example the telescopic poles commonly available can be used with the hand saw, for greatly extending its reach. Alternatively the user may use a number of different extension poles for different purposes. Thus, a hunter may only want to carry a shorter extension while hunting, but when he returns to work on his farm, he may need a longer extension. Of course the present invention will accommodate any length of extension pole.

BRIEF DESCRIPTION OF THE DRAWINGS

The foregoing and other objects and advantages of this invention will become apparent from a detailed consideration of the foregoing description of the invention when taken together with the accompanying drawings, in which.

DETAILED DESCRIPTION OF PREFERRED EMBODIMENTS

The invention will now be described in greater detail with reference to the accompanying drawings.

Figure 1:
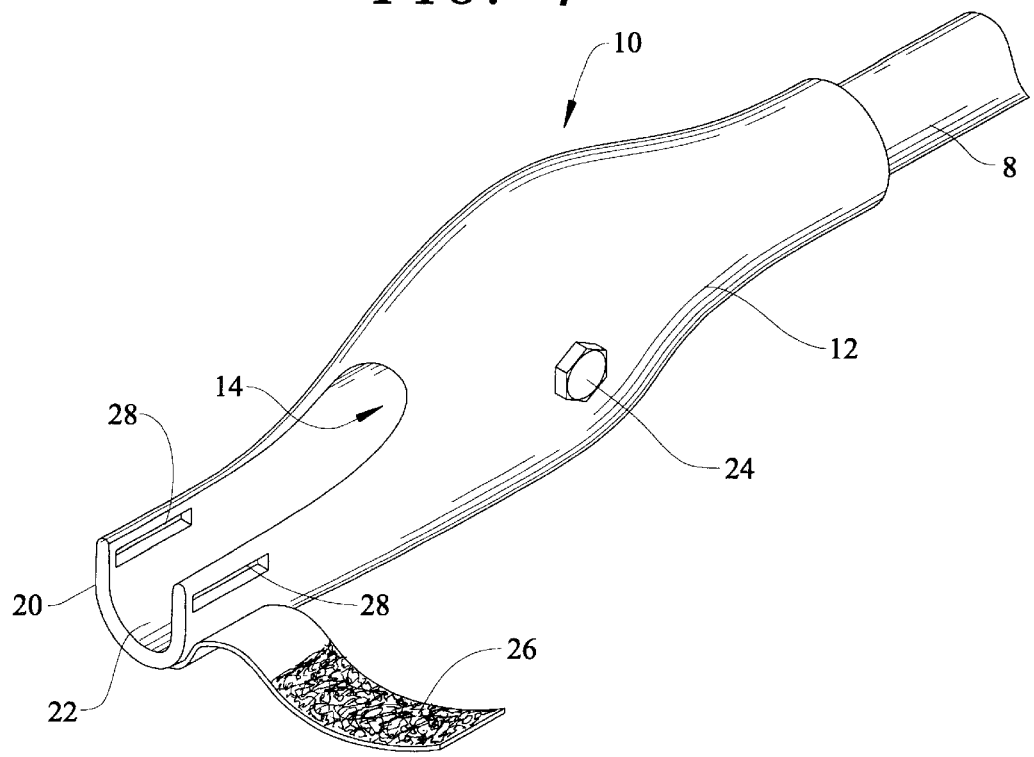
FIG. 1 is a perspective view of a hand saw accessory in accordance with this invention.
Figure 3:
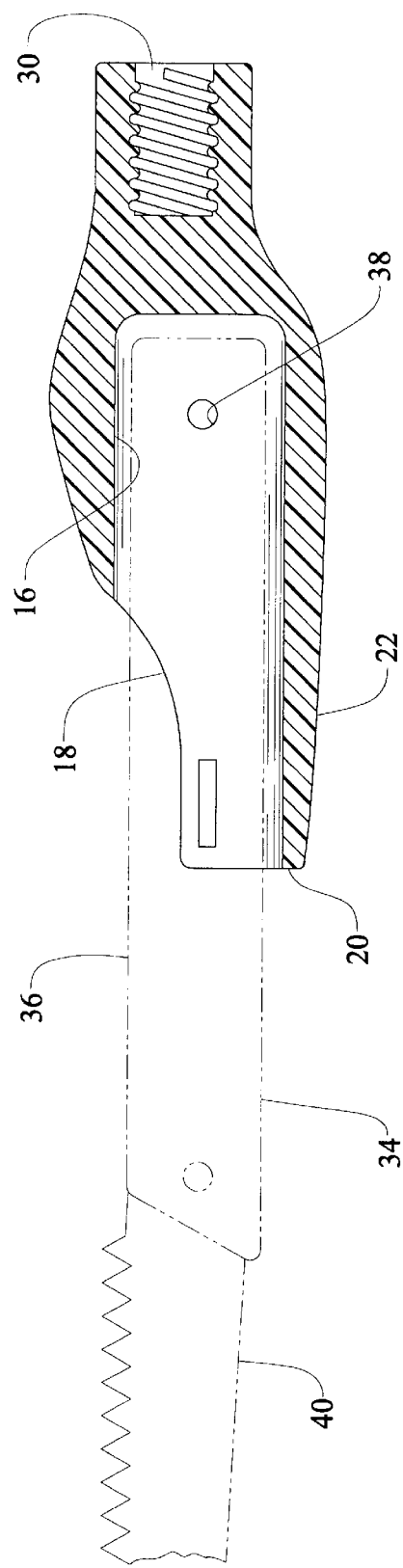
FIG. 3 is longitudinal cross-section of the accessory showing a handle in dotted lines in position in the accessory.

FIG. 1 shows the saw accessory generally designated 10 and including an accessory body 12. At one end of the body 12, an extension pole P may be attached in a manner as will be shown in greater detail below. At the other end, a saw supporting opening 14 is provided in the body 12. As seen in FIG. 3, the opening comprises a shaped recess 16 extending into the body 12. The opening is partially cut away at 18 toward the front of the body 20, leaving a supporting portion 22 on the side of the body which is opposite to the side intended to have the saw teeth.

A removable fastener such as a bolt or screw 24 extends through the body 12, and in addition is positioned in such a manner that it will be able to pass through the hole 38 found in the end of most saws. This bolt or screw 24 serves to retain and secure the saw in the opening 14. Of course the head of the bolt or screw 24 may be recessed into the body 12 if desired for aesthetic purposes or to avoid contact therewith when using the saw.

Figure 2:
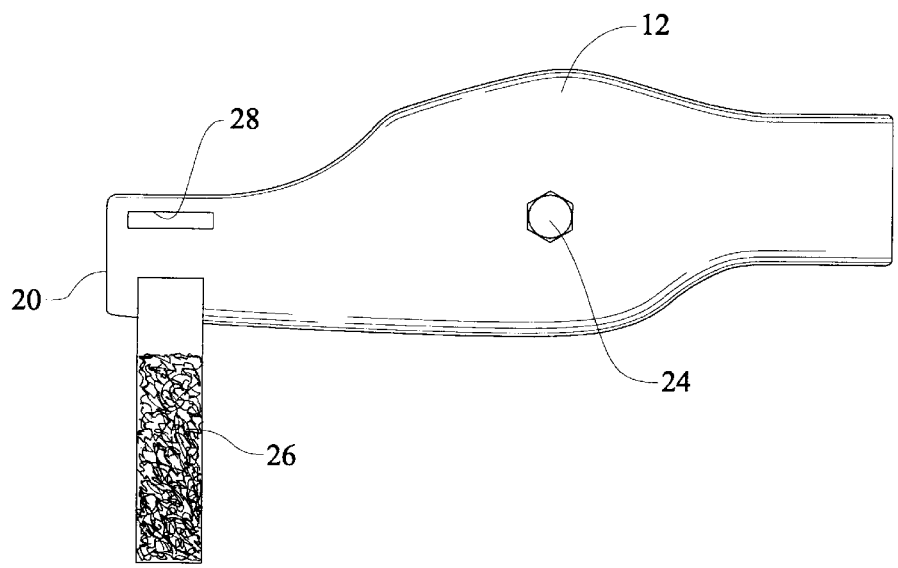
FIG. 2 is a side view thereof.

A securing strap 26 is also preferably provided near the 10 front end 20 of the body for securing a saw to the accessory body. For this purpose, openings 28 may be provided in the body, with the strap passing through the openings, around the saw handle, and back onto itself. Alternatively, the strap may be fastened to the body by any suitable means such as adhesive or the like in the manner shown in FIG. 2, and pass completely around the saw handle and the body and be secured onto itself. The securing strap 26 comprises a hook-and-loop fastening material, and thus is secure and releasable.

At the other end of the accessory body, a threaded opening 30 is provided. The threads are preferably of the "Acme" configuration so as to threadedly receive standard, available extension poles. These poles are most commonly used with tools such as paint rollers, mops and the like.

In use, a folding saw 34 is opened to its use position, and the handle 36 is inserted into the supporting opening 14, with the blade 40 projecting out of the body 12. The bolt or screw 24 is inserted through the accessory body and through the hole 38 in the saw handle and secured by a nut. The strap 26 then is passed around the saw handle and the accessory body and is secured on itself. In this manner, the saw has two attachment points, the bolt 24 and the securing strap 26. The body 12 may then serve as a handle for the saw or may receive an extension pole of any desired length threaded inserted into the opening 30.

The saw will then be usable with a much greater reach for sawing tree limbs, or the like, which would otherwise be out of reach.

While this invention has been described as having certain preferred features and embodiments, it will be apparent that it is capable of still further variation and modification without departing from the spirit of the invention, and this application is intended to cover any and all variations, modification and adaptations of the invention as may fall within the spirit of the invention and the scope of the accompanying claims.

I claim:

1. A folding saw in combination with an accessory body, said saw comprising a handle and a folding saw blade secured thereto, said accessory body comprising an elongated body portion, a longitudinal passageway extending into said body portion from one end thereof, said handle being positioned in said passageway in such a manner that the blade of said saw projects beyond one end of said body, said passageway including a cutout formed in one longitudinal side of said body portion and forming a supporting portion, securing means for passing through said body portion and through said handle for retaining said handle in said passageway, means for encircling said body portion and said handle for securing said saw in said passageway, and an axial passageway extending into the other end of said body portion for receiving an extension pole.

2. A folding saw accessory comprising an elongated body portion, a longitudinal passageway extending into said body portion from one end thereof for receiving the handle of a folding saw therein, said passageway including a cutout formed in one longitudinal side of said body portion and forming a supporting portion, securing means for passing through said body portion and through the handle of a saw for retaining a saw in said passageway, means for encircling said body portion and the handle of a saw for securing a saw in said passageway, and an axial threaded passageway extending into the other end of said body portion for receiving an extension pole.

3. A folding saw accessory as in claim 2 and wherein said encircling means comprises a fastening strap having a hook and loop fastener thereon.

4. A folding saw accessory as in claim 3 and wherein said securing means comprises a bolt or screw.

5. A folding saw accessory as in claim 4 and including a pair of openings formed in said body portion near said one end for receiving said fastening strap.

* * * * *